United States Patent
Abdulov

(10) Patent No.: US 11,194,044 B2
(45) Date of Patent: Dec. 7, 2021

(54) OBJECT MOVEMENT DETECTION BASED ON ULTRASONIC SENSOR DATA ANALYSIS

(71) Applicant: TYMPHANY ACOUSTIC TECHNOLOGY (HUIZHOU) CO., LTD., Guangdong Province (CN)

(72) Inventor: Alexey Abdulov, Taipei (TW)

(73) Assignee: Tymphany Acoustic Technology (Huizhou) Co., Ltd., Huizhou (CN)

( * ) Notice: Subject to any disclaimer, the term of this patent is extended or adjusted under 35 U.S.C. 154(b) by 178 days.

(21) Appl. No.: 16/790,389

(22) Filed: Feb. 13, 2020

(65) Prior Publication Data

US 2021/0255318 A1    Aug. 19, 2021

(51) Int. Cl.
  *G01S 15/50* (2006.01)
  *G01S 15/08* (2006.01)
  *G01S 7/52* (2006.01)

(52) U.S. Cl.
  CPC ............... *G01S 15/50* (2013.01); *G01S 7/52* (2013.01); *G01S 15/08* (2013.01)

(58) Field of Classification Search
  CPC ............. G01S 15/50; G01S 7/52; G01S 15/08
  See application file for complete search history.

(56) References Cited

U.S. PATENT DOCUMENTS 3,650,628 A * 3/1972 Tawfik .................. G01S 13/14
                                                                  356/5.05
8,878,697 B2   11/2014 Subramanya
9,470,780 B2 * 10/2016 Haußermann .......... G01S 15/08
2010/0152600 A1   6/2010 Droitcour et al.
2013/0144166 A1   6/2013 Specht et al.
2021/0255318 A1*   8/2021 Abdulov ................... G01S 7/52
2021/0255319 A1*   8/2021 Abdulov ............... G01S 15/931

FOREIGN PATENT DOCUMENTS

CN         104700434 B       10/2017
CN         113253287 A   *   8/2021
DE    102021103324 A1   *   8/2021
DE    102021103340 A1   *   8/2021

OTHER PUBLICATIONS

Patentability Search Report, dated Feb. 19, 2019.

* cited by examiner

*Primary Examiner* — Daniel Pihulic
(74) *Attorney, Agent, or Firm* — Muncy, Geissler, Olds & Lowe, P.C.

(57) ABSTRACT

Methods and devices for detecting movement of an object includes: receiving a plurality of output signal values from a sound wave receiver, each of the plurality of output signal values being representative of a distance between the object and the sound wave receiver; determining, based on the received plurality of output signal values, a difference value representative of a difference between a first output signal value and a second output signal value among the plurality of output signal values; determining whether the difference value is representative of motion of the object based on whether the difference value has a magnitude between a predetermined minimum threshold and a predetermined maximum threshold; and outputting a motion detection signal if the difference value is determined to have a magnitude between the predetermined minimum threshold and the predetermined maximum threshold.

20 Claims, 7 Drawing Sheets

The specification generally relates to ultrasonic sensors, and more particularly, to methods and devices for object movement detection based on ultrasonic sensor data analysis.

OBJECT MOVEMENT DETECTION BASED ON ULTRASONIC SENSOR DATA ANALYSIS

TECHNICAL FIELD

The specification generally relates to ultrasonic sensors, and more particularly, to methods and devices for object movement detection based on ultrasonic sensor data analysis.

BACKGROUND

Proximity sensors are used to detect objects and object motion in proximity to the sensors. Ultrasonic sensors may detect objects and object movement by emitting ultrasonic sound waves from an ultrasonic wave source and detecting echoes of the ultrasonic waves that are reflected by surrounding objects. If the ultrasonic sensor receives echoes of the ultrasonic waves, it may determine that one or more objects are near the ultrasonic sensor. Based on the reception times and patterns of the echoes, the ultrasonic sensor may identify distinct objects in the vicinity of the sensor as well as movement characteristics of the objects.

SUMMARY

In one aspect, there is provided a computer-implemented method for detecting movement of an object. The method includes: receiving a plurality of output signal values from a sound wave receiver, each of the plurality of output signal values being representative of a distance between the object and the sound wave receiver; determining, based on the received plurality of output signal values, a difference value representative of a difference between a first output signal value and a second output signal value among the plurality of output signal values; determining whether the difference value is representative of motion of the object or non-motion of the object based on whether or not the difference value has a magnitude greater than or equal to a predetermined minimum threshold and smaller than or equal to a predetermined maximum threshold; and outputting a motion detection signal if the difference value is determined to have a magnitude greater than or equal to the predetermined minimum threshold and smaller than or equal to the predetermined maximum threshold.

In another aspect, there is provided a device for detecting movement of an object. The device includes a sound wave receiver, a processor, and a memory coupled to the processor. The memory is configured to store instructions which when executed by the processor become operational with the processor to: receive a plurality of output signal values from the sound wave receiver, each of the plurality of output signal values being representative of a distance between the object and the sound wave receiver; determine, based on the received plurality of output signal values, a difference value representative of a difference between a first output signal value and a second output signal value among the plurality of output signal values; determine whether the difference value is representative of motion of the object or non-motion of the object based on whether or not the difference value has a magnitude greater than or equal to a predetermined minimum threshold and smaller than or equal to a predetermined maximum threshold; and output a motion detection signal if the difference value is determined to have a magnitude greater than or equal to the predetermined minimum threshold and smaller than or equal to the predetermined maximum threshold.

In yet another aspect, there is provided a non-transitory computer-readable storage medium. The non-transitory computer-readable storage medium includes instructions for detecting movement of an object, which instructions when executed by a processor become operational with the processor to: receive a plurality of output signal values from the sound wave receiver, each of the plurality of output signal values being representative of a distance between the object and the sound wave receiver; determine, based on the received plurality of output signal values, a difference value representative of a difference between a first output signal value and a second output signal value among the plurality of output signal values; determine whether the difference value is representative of motion of the object or non-motion of the object based on whether or not the difference value has a magnitude greater than or equal to a predetermined minimum threshold and smaller than or equal to a predetermined maximum threshold; and output a motion detection signal if the difference value is determined to have a magnitude greater than or equal to the predetermined minimum threshold and smaller than or equal to the predetermined maximum threshold.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
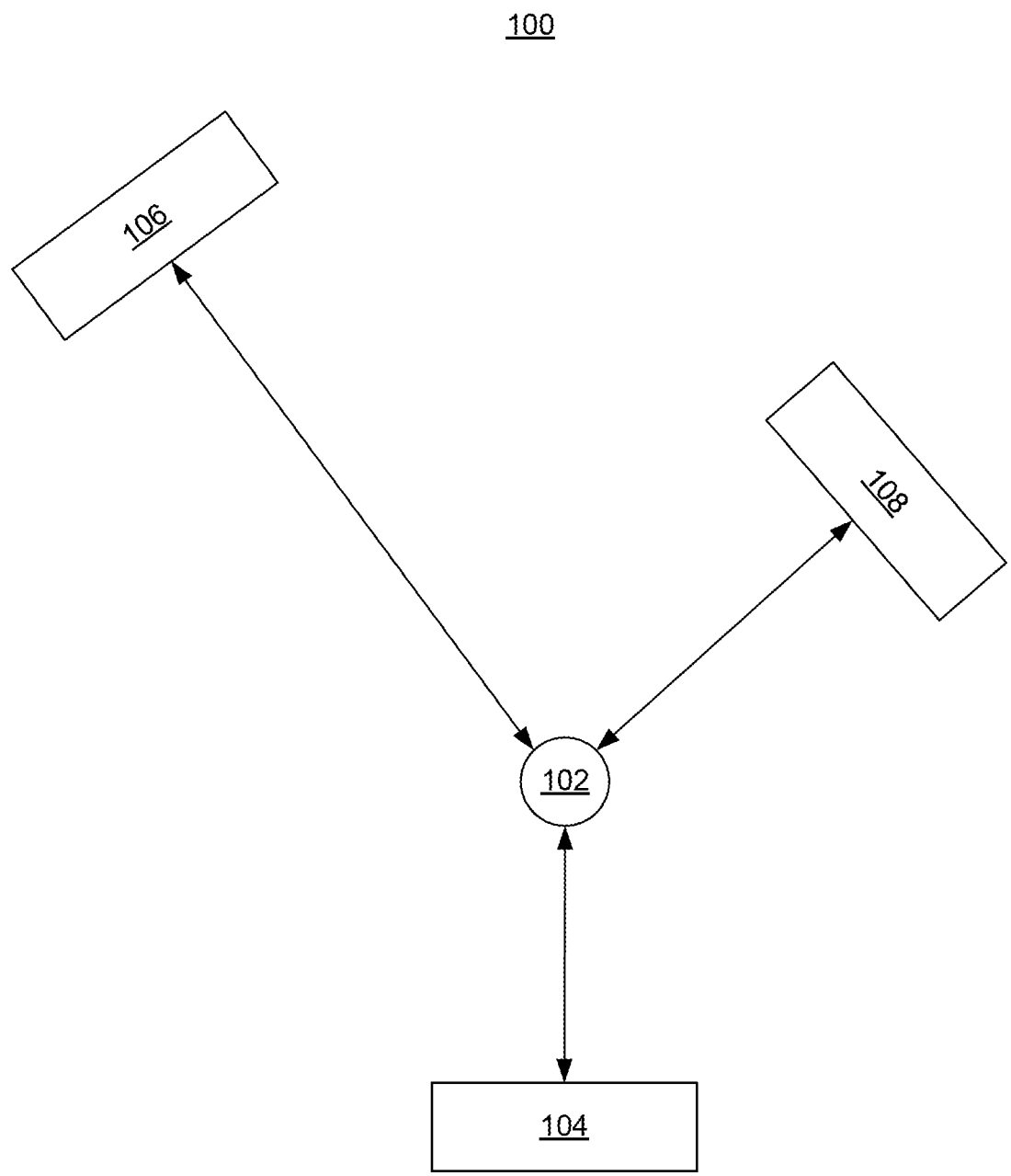
FIG. 1 is a diagrammatic representation of an exemplary scenario including acoustic signal emission and reception by a sound wave receiver.

Object movement detection may be used in a wide range of scenarios. For example, motion sensing systems may be used on vehicles to detect moving objects in blind zones near a vehicle, such as a backup sensing system. For another example, motion sensing systems may be used on a stereo system to detect moving human beings near speakers or microphones of the system. Based on the detected moving human beings, the stereo system may balance the volume load, cancel microphone echoes, activate the stereo system, increase or decrease volume of the stereo system, illuminate one or more controls (e.g., a button, a touchscreen, an LED indicator, or the like), activate one or more onboard lights, illuminate a user interface panel, or the like.

In an object movement detection device, one or more ultrasonic sources and sensors may be configured to emit and detect ultrasonic waves. The sources and sensors may be configured to face one or more directions to cover one or more corresponding angles of space, in which movement of objects may be detected. A typical approach ("single-threshold approach") to detect movement of an object in the vicinity may determine a set of distances of the object over a time period, then determine whether the object is moving based on a change of the set of distances. For example, an ultrasonic sensor (e.g., Texas Instruments PGA460) used in the single-threshold approach may generate distance data indicative of distances to a detected object in the vicinity over a time period. Changes of the distance data may be compared with a predetermined threshold value. If the changes exceed the threshold value, the object may be determined as moving in the time period. Otherwise, the object may be determined as still.

However, the single-threshold approach may have challenges in detecting the movement of objects. For example, when the object has a small longitudinal component of movement, or when different objects move relative to the ultrasonic sensor substantially in a circular path, the single-threshold approach may fail to detect such movements because the distance between the object and the ultrasonic sensor along the longitudinal direction may change little or none. In another example, when the object has irregular shapes or surfaces, a small change (e.g., a rotation) of the position of the object may cause a large change in the reflected response relative to that object, which may result in false motion detections. In another example, when the object has a surface non-perpendicular to the reflection direction of the ultrasonic wave, such as a curved or slanted surface, the reflected ultrasonic waves received at the sensor may constitute a flat signal envelope with few, if any, waveform features such as spikes associated with relatively strong reflections received for particular time of flights/distances. In such examples, among many others, difficulties may exist in detecting the objects, detecting motion of the objects, and/or determining the number of detected objects. In many cases, single distance threshold-based systems may fail to overcome these challenges.

Disclosed embodiments provide methods and devices for object movement detection by taking advantage of observable fluctuations of the output of an ultrasonic sensor or values generated based on the output. In this approach, a processor may receive a set of data from an ultrasonic sensor or may generate or aggregate a set of data based on output received by the processor from the ultrasonic sensor. The set of data may include values indicative of distances from the ultrasonic sensor to objects detected in the environment of the sensor. For example, the set of data may include values representative of distances, at a particular time, between the sensor and one or more objects detected in the environment of the sensor. In some cases, the set of data may include values representative of distances, at different times, between the sensor and a particular object detected in the environment of the sensor. For example, the values included in the set of data may indicate how a distance between the sensor and an object detected in the environment of the sensor changes over time.

Thus, in some cases, a processor may receive a set of values from an ultrasonic sensor, the values being indicative of distances between the ultrasonic sensor and detected objects in the environment of the sensor. In other cases, the processor may receive distance measurements from a sensor and assemble the sets of values. For a single ultrasonic burst event (e.g., where ultrasonic waves are emitted into an environment or a portion of the environment of the sensor), the sensor may be configured to output one or more distance values corresponding to each of one or more objects in the environment of the sensor detected based on received reflection signals. For example, based on emitted ultrasonic signals and reception by the sensor of reflections of the emitted ultrasonic signals from objects in the environment, the sensor may determine a time of flight associated with each received signal reflection. Such times of flight may then be correlated with distance values between the sensor and the detected objects. In one example, after an ultrasonic signal emission, the sensor may determine that objects A, B, and C are present in the environment of the sensor at distances of 1 m, 2 m, and 3 m from the sensor, respectively.

Subsequent emission events and analysis of subsequently received reflections may enable the sensor and/or the processor to determine how distance measurements relative to one or more of the objects in the environment change over time. Continuing the example above, during a subsequent ultrasonic emission and reflection analysis event, the sensor may indicate that objects A, B, and C are again detected. This time, however, the sensor may indicate that objects A, B, and C are detected to be located at distances of 1.5 m, 2 m, and 2.5 m from the sensor, respectively. The distance values output by the sensor (and associated with the detected objects) may be tracked over time, e.g., by the processor, to determine movement characteristics of the detected objects. Monitoring how these distance values change over time, as discussed in more detail below, may enable the presently disclosed systems to more accurately detect actual motion of objects and reduce the number of false motion detections.

The distance information included in the collected or assembled sets of data may be used to detect motion associated with one or more objects in the environment of the sensor. For example, by comparing the fluctuations of the detected distances with a predetermined range (e.g., within upper and lower threshold limits), the processor may determine whether detected objects are moving. This approach may increase the sensitivity of all-direction object movement detection including the azimuthal direction, suppress the false-detection rate and the false-rejection rate, and differentiate objects moving with respect to the ultrasonic sensor in a substantially circular manner.

FIG. 1 is a diagrammatic representation of an exemplary scenario including acoustic signal emission and reception by a sound wave receiver. FIG. 1 includes sound wave receiver 102 and objects 104-108 in a surrounding environment of sound wave receiver 102. In some embodiments, sound wave receiver 102 may be an ultrasonic sensor or transducer. A sound source (e.g., an ultrasonic source) may emit sound waves (e.g., ultrasonic waves) into the environment, such as in a full range of angles. The sound waves may be reflected by objects 104-108 back to sound wave receiver 102. In some embodiments, the sound source may be integrated with sound wave receiver 102 as a single device. In those cases, the arrows in FIG. 1 indicate the directions of the sound waves emitted and reflected. Sound wave receiver 102 may generate data (e.g., analog data or digital data) indicative of distances to the detected objects, such as objects 104-108. In some embodiments, the data may be transmitted to a processor (not shown in FIG. 1) for further analysis. In some embodiments, the processor may be integrated with sound wave receiver 102 as a single device. In some embodiments, the processor may not be integrated with sound wave receiver 102.

Figure 2:
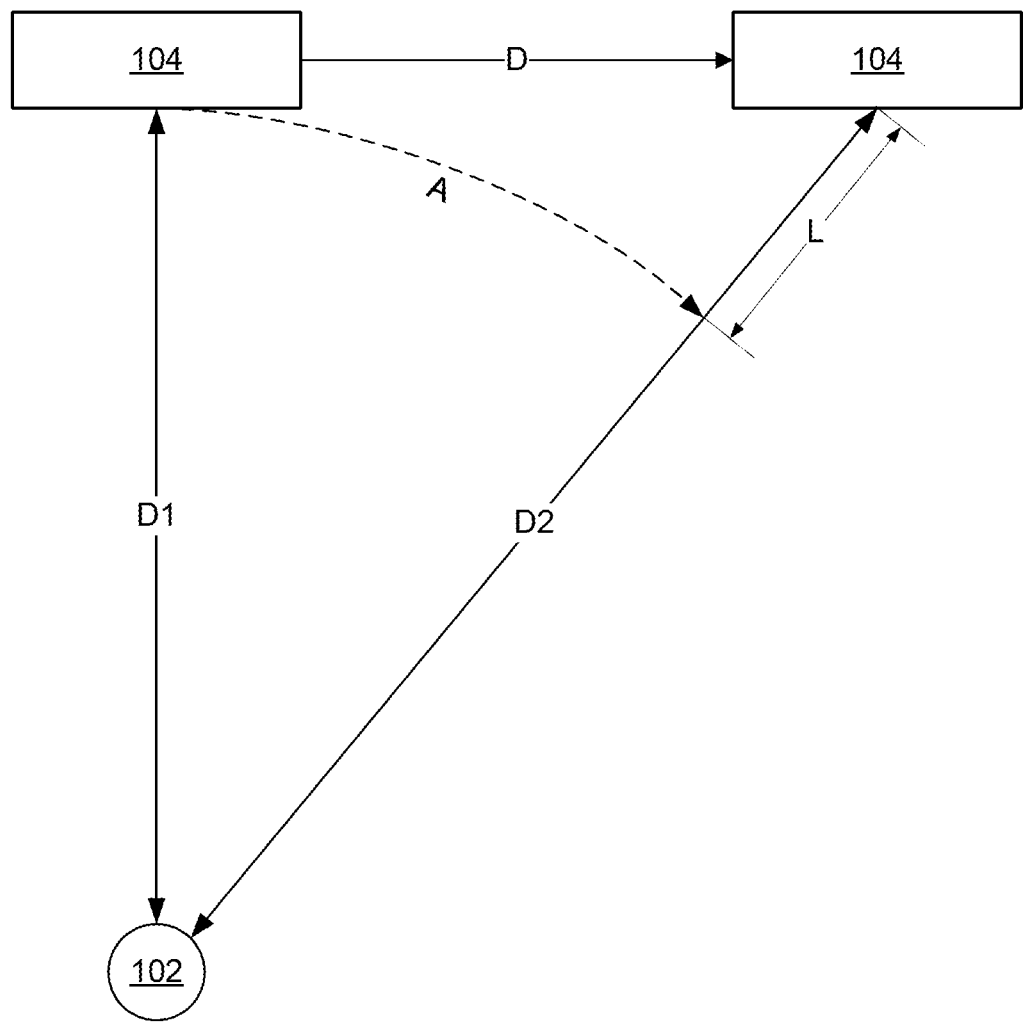
FIG. 2 is another diagrammatic representation of an exemplary scenario including acoustic signal emission and reception by a sound wave receiver.

FIG. 2 is another diagrammatic representation of an exemplary scenario including acoustic signal emission and reception by a sound wave receiver. FIG. 2 illustrates certain challenges of a single-threshold distance approach in accurately detecting the movement of objects when the object, for example, has a small longitudinal component of movement. Referring to FIG. 2, object 104 is moving horizontally from left to right for a distance D. An ultrasonic source is integrated with sound wave receiver 102. Sound wave receiver 102 may emit and receive ultrasonic waves reflected from object 104 during two different burst events, resulting in detected distances D1 and D2 associated with object 104. With respect to sound wave receiver 102, the movement of object 104 may be decomposed to two elements, an azimuthal component A and a longitudinal component L, in which L=D2−D1. With a single-threshold approach, the detectable movement of object 104 with respect to sound wave receiver 102 is the L component. For example, if object 104 moves along arc A in FIG. 2, sound wave receiver 102 may be unable to detect such a movement and may detect object 104 as not moving. Detection of motion may occur when longitudinal distance L is greater than a motion threshold. When L is small, however, sound wave receiver 102 may have challenges in detecting the movement of object 104 using a single distance detection threshold.

Figure 3:
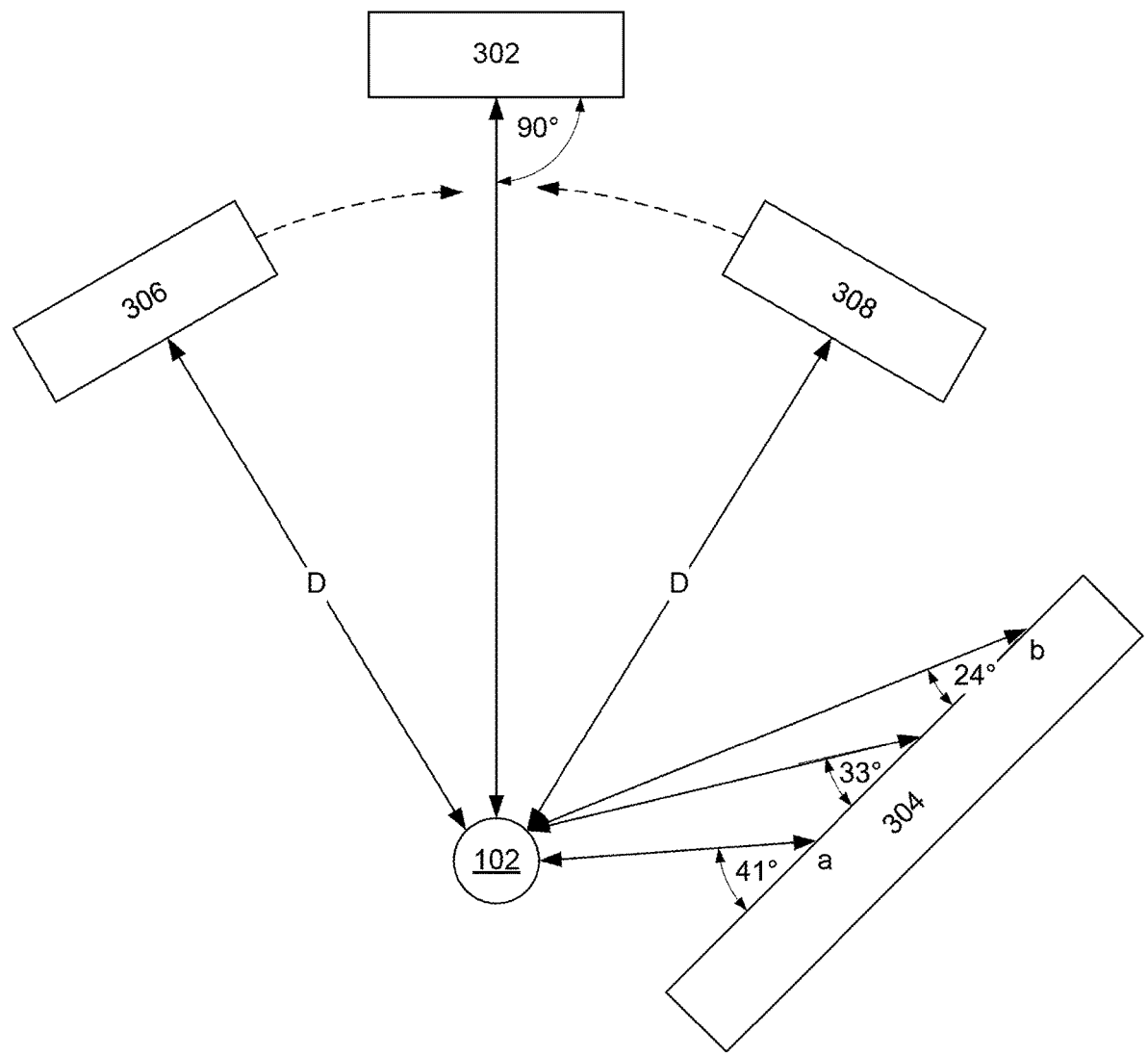
FIG. 3 is another diagrammatic representation of an exemplary scenario including acoustic signal emission and reception by a sound wave receiver.

FIG. 3 is another diagrammatic representation of an exemplary scenario including acoustic signal emission and reception by a sound wave receiver. FIG. 3 illustrates other potential challenges of the single-threshold approach in detecting the movement of objects when the object has non-ideal (e.g., non-perpendicular) shapes or surfaces.

An ideal object for reflecting sound waves may have a reflective surface (e.g., a hard surface), and the surface may be perpendicular to a line connecting the surface and the ultrasonic sensor. For example, in FIG. 3, object 302 may constitute an ideal object for detection because it has a surface that is perpendicular to a line connecting it and sound wave receiver 102. An object having non-ideal shapes or surfaces may have a semi-reflective surface (e.g., a fuzzy or fluffy surface such as clothes) to sound waves, in which the reflection or echoes of the ultrasonic waves may be too weak to detect. An object (e.g., objects having curved surfaces such as a human leg) having non-ideal shapes or surfaces may also have significant portions of the surfaces of the object not perfectly perpendicular to an ultrasonic sensor, in which the reflections of the ultrasonic waves may deviate from the incoming direction of the ultrasonic waves, causing erroneous distance detections.

For example, in FIG. 3, object 304 may be a non-ideal object because its reflective surface is not perpendicular to a line connecting it and sound wave receiver 102. Reflections of sound waves may occur in different locations or a range of locations of object 304, resulting in a range of detected distances associated with object 304. That is, while object 304 is a single object, the ultrasonic signals may reflect from a range of distances along the length of the object 304. FIG. 3 shows a range [a, b] including multiple possible locations of sound wave reflections with differing angles of reflection relative to sound wave receiver 102 (e.g., angles of 27°, 33°, and 41°, respectively). In this example, even a slight change of the angles may cause a significant change in the received reflection signal strengths, which may be interpreted as a longitudinal movement of the object even if no longitudinal movement occurred.

Figure 4:
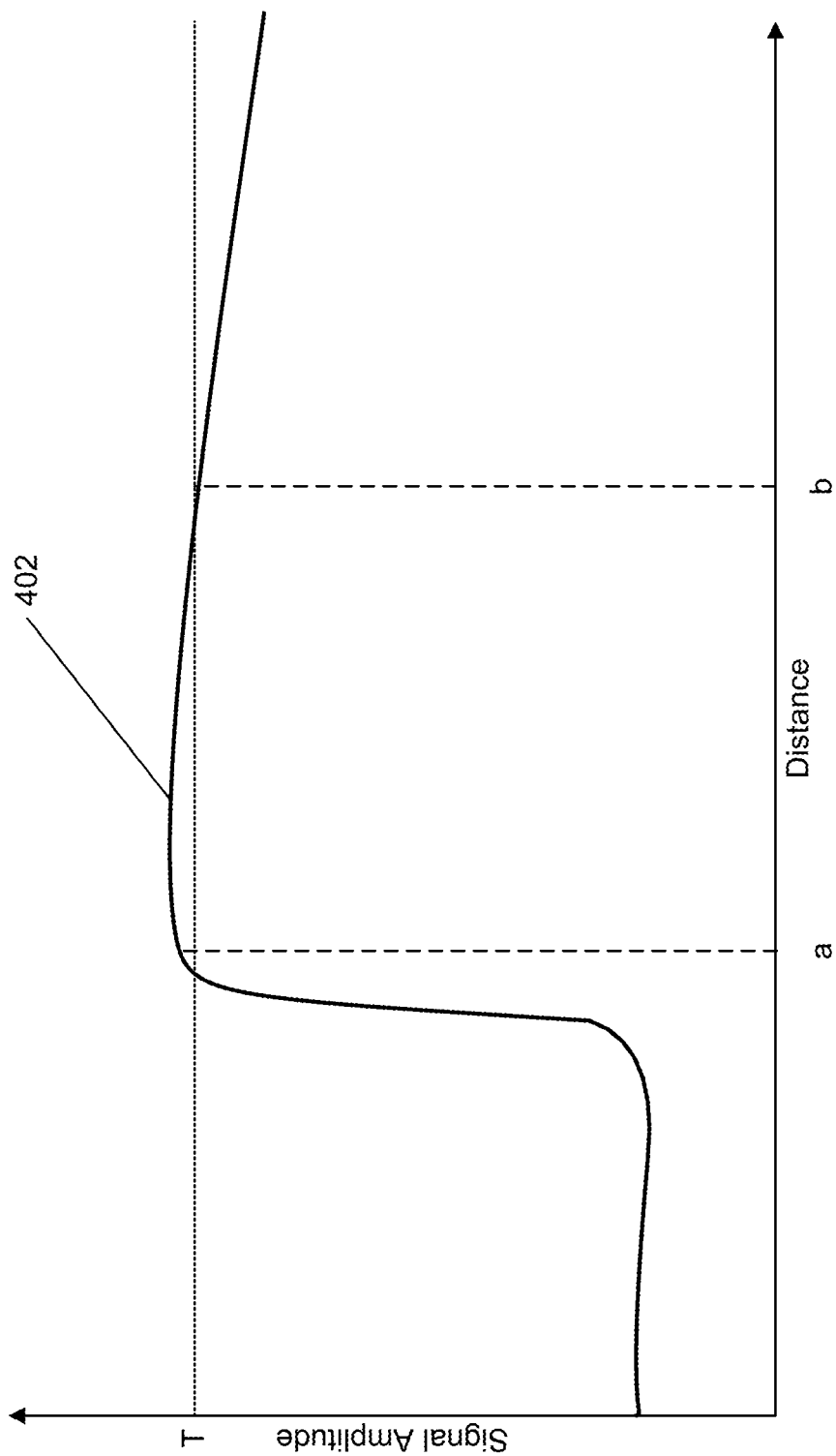
FIG. 4 is a graphical representation of an exemplary relationship between signal amplitude and object distance.

FIG. 4 is a graphical representation of an exemplary relationship between signal amplitude and object distance for the example, of FIG. 3. FIG. 4 shows a signal amplitude curve 402 of an acoustic signal reflected from the surface of object 304 and received by sound wave receiver 102. Referring to FIG. 4, the vertical axis represents signal amplitude, and the horizontal axis represents distances determined based on the signal amplitude and time of flight information. Notably, object 304 is not associated with a single distance (which would be indicated by a relatively narrow peak at a particular distance associated with object 304). Instead, as shown in FIG. 4, object 304 in the orientation shown in FIG. 3 results in a broad range of distances from distance a to distance b that are all associated with object 304 and all exceed a signal strength detected threshold, T. As a result, even slight changes in orientation of object 304 relative to the sensor may trigger significant changes in distance determinations relative to object 304.

Referring back to FIG. 3, FIG. 3 also illustrates the challenges of a single-threshold approach in detecting the movement of objects when different objects move relative to the ultrasonic sensor substantially in a circular path. For example, in FIG. 3, objects 306 and 308 may be moving in a circular path (e.g., the movement having no longitudinal component) about sound wave receiver 102. The distances from sound wave receiver 102 to objects 306 and 308 are the same, D. As explained in descriptions relating to FIG. 2, the single-threshold approach may be unable to differentiate between objects 306 and 308. In other words, due to the same distance, sound wave receiver 102 may fail to distinguish between objects 306 and 308 and may detect them as a single object. In such an example, if one of objects 306 or 308 departs from its circular motion and exhibits a changing longitudinal component of motion relative to the sensor, sound wave receiver 102 may differentiate between objects 306 and 308, but the sudden differentiation may appear as if a new object has suddenly appeared in the environment of the sensor.

In each of these examples, a single-threshold approach may result in high false-rejection rates and/or high false-detection rates. A false rejection occurs when actual movement is not detected, and a false detection occurs when a non-movement is mistaken as movement. One way to cope with such false detections is to raise a detection threshold. However, such an increase in a single threshold can desensitize the system and result in an unintended increase in false-rejections. By adjusting a single threshold value alone, it is difficult to suppress both false rejection and false detection.

It should be noted that, although "ultrasonic" is used throughout this specification, embodiments of this specification are not limited to ultrasonic waves and/or ultrasonic data, and the methods and devices disclosed herein may also be performed or implemented on object movement detection using non-ultrasonic waves, such as audible sound waves, infrasonic waves, or light waves (e.g., infrared light waves, etc.). For ease of explanation without causing ambiguities, ultrasonic waves are used as examples for the description hereinafter, but it should be noted that any suitable signal waves may be used as a medium for object movement detection in place of the ultrasonic waves.

Figure 5:
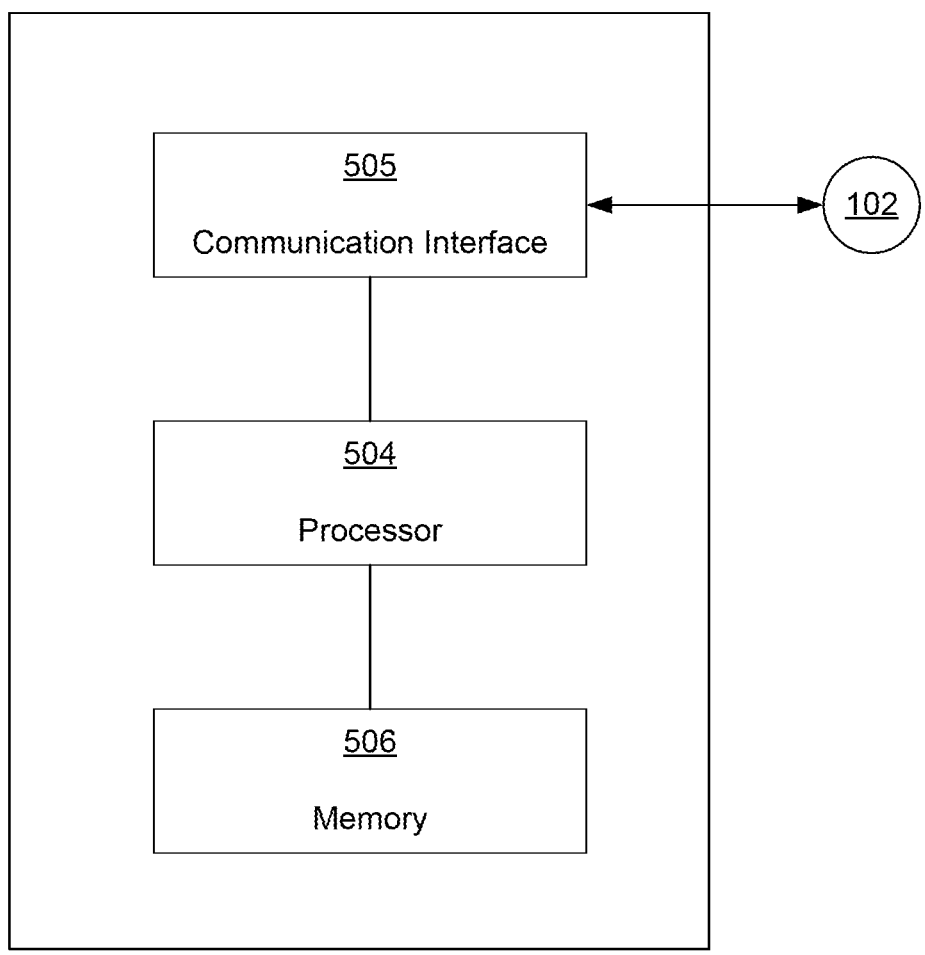
FIG. 5 is a block diagram representation of an example device for object movement detection, according to presently disclosed embodiments.

FIG. 5 is a block diagram of an example device 500 for object movement detection, according to presently disclosed embodiments. Referring to FIG. 5, device 500 may include a communication interface 505, a processor 504, and a memory 506. Communication interface 505, processor 504, and memory 506 may be electrically coupled (indirectly or directly) to one another within device 500. In some embodiments, device 500 may additionally include sound wave receiver 102 as a single device. In some embodiments, device 500 may be independent of sound wave receiver 102.

Communication interface 505 may be configured to communicate with sound wave receiver 102 to receive data generated by sound wave receiver 102 or to transmit control data to sound wave receiver 102. In some embodiments, when device 500 is independent of sound wave receiver 102, communication interface 505 may be coupled or connected to sound wave receiver 102 according to a communication standard or protocol. The communication standard may include, for example, a wired communication standard, a Bluetooth® standard, a near-field communication (NFC) standard, an infrared communication protocol, or any suitable wired or wireless communication standard. In some embodiments, when device 500 includes sound wave receiver 102, communication interface 505 may be coupled or connected to sound wave receiver 102 by an internal bus.

Processor 504 may include any electronic device capable of manipulating or processing information. When processor 504 is programmed with instructions described herein (e.g., by providing processor 504 with access to one or more storage devices (e.g., such as memory 506) including the instructions described herein), device 500 may become a specialized machine for motion detection. Processor 504 may include an integrated circuit or a chip for processing data, such as data communicated from communication interface 505. For example, processor 504 may include any combination of any number of a programmable logic controller, a microcontroller, a microprocessor, a digital or analog signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), a central processing unit (or "CPU"), a graphics processing unit (or "GPU"), an optical processor, or any type of circuits capable of data processing. Processor 504 may be coupled with memory 506 and execute instructions stored in memory 506.

Memory 506 may be a generic or specific electronic device capable of storing codes and data accessible by processor 504. Memory 506 may include any type of volatile or non-volatile memory devices, or a combination thereof. For example, memory 506 may include any combination of any number of a random-access memory (RAM), a static random-access memory (SRAM), a read-only memory (ROM), an electrically erasable programmable read-only memory (EEPROM), an erasable programmable read-only memory (EPROM), a programmable read-only memory (PROM), an optical or magnetic disc, a hard drive, a solid-state drive, a flash drive, a security digital (SD) card, a memory stick, a compact flash (CF) card, or any type of storage device. When the instructions in memory 506 are executed by processor 504, device 500 may perform an operation on the data received from sound wave receiver 102.

Figure 6:
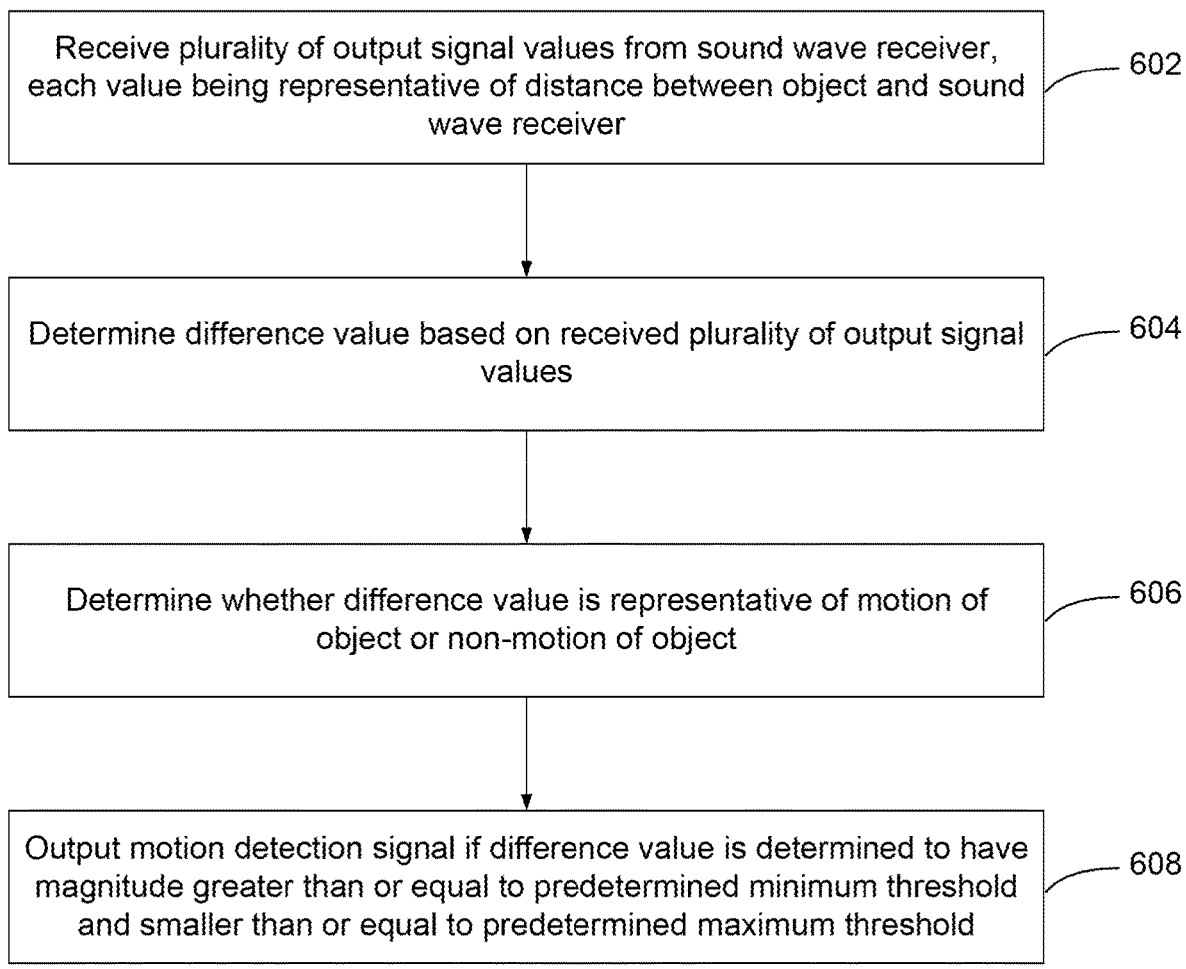
FIG. 6 is a flowchart of an example method for object movement detection, according to presently disclosed embodiments.

FIG. 6 is a flowchart of an example method 600 for object movement detection, according to presently disclosed embodiments. For example, method 600 may be performed by device 500. In some embodiments, method 600 may be implemented as software or firmware, such as program codes or instructions, stored in a computer-readable storage medium (e.g., memory 506). The program codes or instructions may be read and executed by a processor (e.g., processor 504) to implement method 600.

Referring to FIG. 6, at step 602, a processor (e.g., processor 504) receives a plurality of output signal values from a sound wave receiver (e.g., sound wave receiver 102). Each output signal value may be representative of a distance between an object and the sound wave receiver. The sound wave receiver may generate the output signal values representing the distances at a particular time. For example, the sound wave receiver may sample the received signal reflections for a particular range of times at which signal reflections are expected. Assuming sound travels at 343 m/s, an example of a range of values for relevant times of flight may include 0 to 30 milliseconds (corresponding to a distance range of 0 m to about 10 m from the sensor). Of course, other time ranges may be used depending on the requirements of a particular application and how far from the sensor objects of interest are expected to occur. After an ultrasonic burst, for example, the sensor may "listen" for a period of time (e.g., 20 ms, 30 ms, 40 ms, 50 ms, or more) and receive ultrasonic signals reflecting from objects in the environment. Each received reflected signal may be received at a particular time during the listen period, and the distance to the object from which the received signal was reflected may be determined based on the time at which the sensor received the reflected signal. Received reflected signals may be associated with increases in signal amplitude at the time of reception. Using the detected received signals and their corresponding times of reception, the sensor can output distance values associated with one or more of the received reflected signals, the distance values corresponding, e.g., to distances between the sensor and objects detected in the environment of the sensor. In some embodiments, the received output signal values may be stored (e.g., in memory 506) as an array.

In some embodiments, the processor may receive the output signal values via a communication interface (e.g., communication interface 505). In some embodiments, the sound wave receiver may include an ultrasonic sensor. In some embodiments, the sound wave receiver may include an ultrasonic transducer.

In some cases, the output signal values received by the processor may include at least two output signal values, such as a first output signal value and a second output signal value. The first output signal may correspond, for example, to a first distance value (or indicator of distance) associated with a first object detected in the sensor environment. The second output signal may correspond to a second distance value (or indicator of distance) associated with a second object detected in the sensor environment. In such cases, the first and second output signals may originate from a common "listen" period of the sensor. In other cases, the first output signal value may be associated with a first distance value (or indicator of distance) associated with a first object detected in the sensor environment, and the second output signal value may be associated with another distance value (e.g., the same or different) associated with the first object. In such cases, the first and second output signal values may originate from different "listen" periods of the sensor.

In some cases, the sound wave receiver may output the first output signal value at a first timestamp and the second output signal value at a second timestamp. The second timestamp may be after the first timestamp and may occur within a same "listen" period as the first timestamp or within a subsequent "listen" period. In some embodiments, the sound wave receiver may output no output signal values between the first and second timestamps. For example, the sound wave receiver may output the first and second output signal values at adjacent timestamps. In some embodiments, the sound wave receiver may output one, two, three, or any number of output signal values between the first and second timestamps. For example, the sound wave receiver may output the first and second output signal values in a non-adjacent manner, such as separated by one output value, separated by two output values, three output values, or by any other periodic pattern or pairing protocol.

Figure 7:
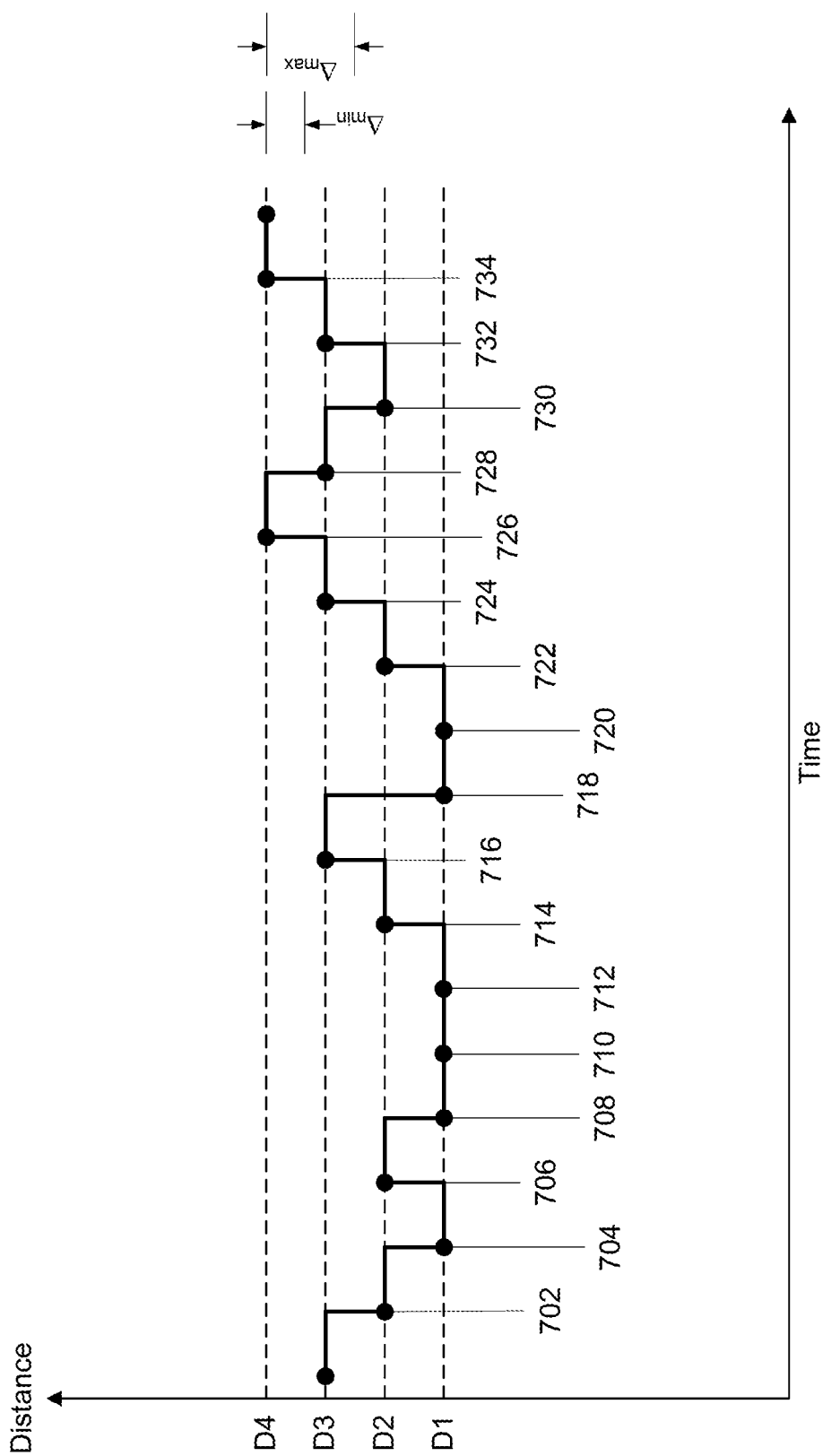
FIG. 7 is a graphical representation of a time-dependent distribution of output signal values indicative of distances from an object, according to presently disclosed embodiments.

In some embodiments, the received output signal values may be represented as shown in FIG. 7. FIG. 7 is a graphical representation of a time-dependent distribution of output signal values indicative of distances from an object, according to presently disclosed embodiments. In some cases, the values represented in FIG. 7 may represent distance values associated with a particular object detected in an environment of the sensor determined as the object moves over time. In some examples, each distance measurement may be derived from different "listen" periods of the sensor (e.g., sequential or non-sequential listen periods). Referring to FIG. 7, the horizontal axis represents the times when the processor receives the output signal values (or any other time values associated with the detection of distances associated with objects in the sensor environment). The vertical axis represents the output signal values indicative of the detected distances to the object, including values 702-734. In this example, the values 702-734 are shown as round black dots and have four different values D1, D2, D3, and D4. Values D1, D2, D3, and D4 in FIG. 7 are shown as equidistant. However, it should be noted that values 702-734 may have other possible values and may not be limited to any finite set of values. For example, the distance values may vary smoothly over time. In some embodiments, the sound wave receiver may generate the output signal values in a temporal order. Each output signal value may be generated by the sound wave receiver at a different timestamp. The generated output signal values may be received by the processor at step 602.

In one example, the processor may receive distance values 720-728 (among other received values) and store them as an array [D1, D2, D3, D4, D3] in the memory, each distance value being associated with a particular detected object at a particular timestamp. As noted above, the array of distance values may be assembled by monitoring the distance values output from the sensor over time such that the movement of a particular detected object may be detected and/or characterized. In some embodiments, the first and second output signal values, such as {702, 704}, {704, 706}, {706, 708}, and so forth, may originate from sequential listen periods for the sensor, but in other cases, the first and second output signals may originate from non-sequential listen periods. It should be noted that although values 702-734 in FIG. 7 are shown as received or determined periodically, in some embodiments, the interval between them may be non-equal.

Referring back to FIG. 6, at step 604, based on the plurality of output signal values received at step 602 (e.g., a first distance value 702, associated with a first object, determined during a first listen period and a second distance value 704, associated with the first object, determined during a second listen period after the first listen period), the processor may compare the output signal values/distances. In some cases, the comparison may be recorded as a difference value (e.g., a difference between distance value 704 and distance value 702). The difference value may represent a difference between the first and second output signal values or an amount that the distance to a particular object in the sensor environment changed between the two timestamps associated with the first and second output signal values used to determine the difference value. In some embodiments, the first and second output signal values used to determine the difference value may be adjacent pairs of output signal values. In some embodiments, the first and second output values used to determine the difference value may be non-adjacent pairs of output signal values, such as, for example, every two, three, four, or any number of output signal values in any periodic difference pattern or any pairing protocol. In some embodiments, the difference value may be determined as a difference between any two output signal values received by the processor. In some embodiments, the processor may determine a set including one or more difference values. In other words, the processor may store (e.g., in an array) difference values between one or more pairs of distance values (e.g., [704-702, 706-704, 708-706, . . . ]).

In one particular example, referring to FIG. 7, based on received values 720-728, the processor may assemble and store an array of distance values, such as [D1], or [D1, D2], or [D1, D2, D3], or any other arrays including multiple distance values. Based on any such array including two or more distance values, the processor may determine difference values, such as (D2–D1), (D3–D2), (D4–D3), (D3–D4), etc. These difference values may be used individually to determine motion characteristics of a detected object. In some cases, multiple distance values may be analyzed to observe motion trends of a detected object. For example, multiple difference values may be analyzed to determine a finite motion event (e.g., when a detected object begins a motion event and ends a motion event). Such a motion event may include the object approaching the sensor over a period of time, moving away from the sensor over a period of time, or exhibiting any detectable motion relative to the sensor over a period of time. As noted, the set of the difference values may include only one value (e.g., when only two output signal values are used), and the difference values may be determined based on any adjacent or non-adjacent pair of distance values (e.g., every two, three, four, or any number of output signal values). The non-adjacent values may be in any periodic difference pattern or any pairing protocol.

Referring to FIG. 6, at step 606, the processor may determine whether a particular difference value is representative of the motion of the object or non-motion of the object. This determination may be based on a comparison of the difference value (e.g., how much an object moved between two timestamps) relative to two motion thresholds. For example, the motion determination may be based on whether or not the difference value has a magnitude greater than or equal to a predetermined minimum threshold and smaller than or equal to a predetermined maximum threshold. In some embodiments, the processor may perform steps 604-606 consecutively ("on the fly") for each difference value as soon as it is determined. For example, referring to FIG. 7, as the processor determines distance values 720-728 for a particular detected object, those values may be stored in memory. In some cases, the distance values may be stored as a running array, which includes some or all of the distance values received over time relative to a particular detected object (e.g., [$D1_{720}$, $D2_{722}$, $D3_{724}$, $D4_{726}$, $D3_{728}$]). The distance values included in the array may include two or more distance values for a particular object, as determined based on two or more "listen" periods. At step 604, the processor may determine a first difference value (e.g., $D2_{722}–D1_{720}$) and determine, at step 606, whether this difference value is representative of actual motion of the object or non-motion of the object. This determination, as noted, may be based on a comparison of the difference value with a lower predetermined threshold and an upper predetermined threshold. The upper and lower predetermined thresholds may be selectable based on the requirements of a particular application. The lower threshold may enable the system to reduce or eliminate false positives associated with small difference values (e.g., small changes in detected object distance between two timestamps) that result from noise or non-motion phenomena. The upper threshold may enable the system to reduce or eliminate false positives associated with large difference values that not representative of actual motion (e.g., difference values influenced by noise or object rotations, etc., that may result in larger distance changes between timestamps than expected). For example, in some cases, such as a home setting, objects of interest (e.g., people) may be expected to move within certain velocity limits. One or more of the upper and lower thresholds may be selected in accordance with the expected velocity limits of the objects of interest such that distances between timestamps that are inconsistent with the velocity limits (e.g., a distance difference representative of an object in a home moving at 20 m/s, 30 m/s, 40 m/s, etc.) are not interpreted as actual motion.

In some embodiments, the threshold values (e.g., the minimum and maximum threshold values) may be determined by experiments in a variety of test environments. For example, in a test environment, a test object may be used for simulating a type of movement. The test object may move in a range of reasonable speeds corresponding to the type of movement. The speed values of the test object may be collected, and a minimum threshold and a maximum threshold may be determined from the speed values (e.g., rates at which distance is changing). For example, the minimum threshold may be determined as corresponding to a value near or at the lower end of the range of (e.g., a value within 3%, 5%, 10%, etc. of the lower end of the range) of observed changes in distance corresponding to the tested speed values ranked in a descending order. The maximum threshold may be determined as a value at or near a higher end of the range (e.g., within 3%, 5%, 10%, etc. of the high end of the range) of observed changes in distance corresponding to the tested speed values ranked in descending order. It should be noted that the ways to determine the minimum and maximum threshold values are not limited to the examples described herein and may include an empirical method, a statistical method, a machine learning method, or any other suitable method. Based on the thresholds of the speeds, thresholds of the output signal values may be determined.

In one example, the test object may be used for simulating a walking individual at home. The range of reasonable speeds in this example may be, for example, between 1 meter per second to 2 meters per second. If the sound wave receiver polls in a fixed and equal time window of 50 milliseconds, a reasonable range of the distances moved by the test object may be between 50 millimeters and 100 millimeters. Based on the reasonable range of the distances and the corresponding relationship to the output signal values of the sound wave receiver, a minimum threshold value and a maximum threshold value for the output signal values may be determined in step 606 of method 600, for example, as correlating to observed changes in distance values associated with values at or near an upper end of observed speeds (e.g., within 3%, 5%, 10% of maximum speed values etc.)(max threshold value) and at or near a lower end of observed speeds (e.g., within 3%, 5%, 10% of minimum speed values etc.)(min threshold value).

In another example, the test object may be used for simulating a car approaching a wall (e.g., a car that is backing up in a parking stall against a wall). Typically, speeds expected to be associated with this example may be in the range of about 0.1 meters per second. The experiments may be performed in a similar way as in the example of simulating the walking individual, and the minimum and maximum threshold values of the speed values and output signal values may also be determined similarly. However, if a car is unexpectedly moving at a high speed (e.g., a driver mistakes a gas pedal as a brake), it is desirable to enable the sound wave receiver to identify such an unexpected event as actual motion instead of identifying such a high speed event as unwanted noise. Accordingly, the high end of the range of reasonable speeds may be set as a high value. In some embodiments, the maximum threshold value in this example may be set as infinity.

In some embodiments, when the maximum threshold value is set as infinity, to effectively reduce noise, one or more additional conditions may be introduced. In some embodiments, such an additional condition may include requiring a series of output signal values to fluctuate within a predetermined fluctuation range. For example, in the example of simulating a car approaching the wall, the range of reasonable speeds may be between 0.1 meters per second to infinity. If the sound wave receiver polls in a fixed and equal time window of 50 milliseconds, a reasonable range of the distances moved by the test object may be between 5 millimeters and infinity. Based on the reasonable range of the distances, the minimum and maximum threshold values of the output signal values may be determined to be used in step 606 of method 600. The sound wave receiver may receive a plurality of output signal values. When a first output signal value exceeds the minimum threshold value, and the sound wave receiver receives a second output signal value, the second output signal value may be compared with the first output signal value to determine whether their difference exceeds the predetermined fluctuation range. If their difference does not exceed the predetermined fluctuation range, the second output signal value may be identified as a real signal. Otherwise, the second output signal value may be identified as potential noise. If a potential noise is followed by one or more output signal values within the predetermined fluctuation range, it may be identified as a signal, such as representing motion of the car at an unexpected high speed. If the potential noise is not followed by one or more output signal values within the predetermined fluctuation range, it may be identified as a real noise. In some embodiments, the predetermined fluctuation range may be controlled by a coefficient for accommodating different scenarios. For example, the above-described additional condition may be expressed as:

$$S_{i+1} - S_i \in \alpha \cdot \Delta$$

where $S_i$ and $S_{i+1}$ represents subsequent output signal values, $\Delta$ represents the predetermined fluctuation value, and $\alpha$ represents the coefficient. In some embodiments, $\alpha$ may be 0.5.

In some embodiments, the predetermined fluctuation range may be a percentage associated with at least one of the minimum threshold value or the maximum threshold value of the output signal values. For example, the predetermined fluctuation range may be a percentage (e.g., ±5%) of the minimum threshold value. In some embodiments, the percentage may be associated with other output signal values, such as an output signal value preceding a current output signal value. For example, the predetermined fluctuation range may be a percentage (e.g., ±5%) of the preceding output signal value. In some embodiments, the percentage may be asymmetric. For example, the fluctuation range may be −3% of the minimum threshold value and +8% of the minimum threshold value.

In some embodiments, the predetermined fluctuation range may be a real number associated with at least one of the minimum threshold value or the maximum threshold value of the output signal values. For example, the predetermined fluctuation range may be ±500 of the minimum threshold value (or any other appropriate real number value or range). In some embodiments, the real number may be associated with other output signal values, such as an output signal value preceding a current output signal value. For example, the predetermined fluctuation range may be ±500 of the preceding output signal value. In some embodiments, the real number may be asymmetric. For example, the fluctuation range may be −700 of the minimum threshold value and +900 of the minimum threshold value.

In some embodiments, the predetermined fluctuation range may be determined by a formula. For example, the predetermined fluctuation range may include a percentage plus a real number, both of which may be associated with at least one of the minimum threshold value or the maximum threshold value of the output signal values. In some embodiments, the predetermined fluctuation range may be a dynamic value.

The processor may determine a second difference value (e.g., $D3_{724}$–$D2_{722}$) and determine whether this second difference value is representative of the motion of the object or non-motion of the object. The processor may continue determining difference values and comparing the determined difference values relative to the predetermined upper and lower thresholds to determine whether the detected object is actually moving or not (or moving with motion characteristics within a certain range). If actual motion is determined based on the comparison of one or more difference values to the dual thresholds, then the processor can cause one or more actions (e.g., alerts, change in the state of interface component, etc.).

Returning to the example of FIG. 2, the dual-threshold detection technique outlined above can aid the system in detecting motion of an object in the environment even when the motion follows an arced path (or generally arced path) relative to the sensor (e.g., at a constant distance, or near-constant distance where the L component is small). In the example of FIG. 3, the disclosed system can aid in reducing false positives when a detected object 304 has a non-ideal reflective surface or an orientation that can otherwise contribute to large changes in reflected signal strengths and time of flight measurements, which, in turn, can lead to significant variations in the distance determinations to detected objects.

Returning to FIG. 7, any difference value determined based on the difference (e.g., absolute values) in distance between any two points having different timestamps may be compared to a predetermined minimum threshold $\Delta_{min}$ and a predetermined maximum threshold $\Delta_{max}$. For example, the change in distance between points 714 and 712 is |D2−D1|. As represented in FIG. 7, this difference value may be greater than $\Delta_{min}$ but less than $\Delta_{max}$ and, therefore, may be determined as corresponding to the actual motion of the detected object. On the other hand, the change in distance between points 712 and 710 falls below $\Delta_{min}$ and, therefore, would be determined by the processor as not indicating the motion of the detected object. Similarly, if a change in distance between two points exceeded $\Delta_{max}$ then the processor would also determine that the change in distance was not associated with actual motion of the detected object.

Referring back to FIG. 6, at step 608, if a determined difference value is determined to have a magnitude greater than or equal to the predetermined minimum threshold and smaller than or equal to the predetermined maximum threshold, the processor may output a motion detection signal and/or cause an action in response to detected motion by an object in the sensor environment. In some embodiments, the processor may perform steps 604-608 consecutively ("on the fly") for distance value received for an object in the environment and based on each difference value after it is determined (e.g., based on a new distance value for a particular object as compared to a prior distance value for the object determined based on a prior "listen" period of the sensor). For example, as shown in FIG. 7, as the processor receives distance values 720-728, each new distance value received may trigger the determination of a new difference value by comparing the newly received difference value to a previously obtained distance value. And, each new difference value may be compared to the minimum and maximum thresholds to determine if the object is moving.

In some cases, if a difference value falls between the minimum and maximum thresholds, the processor may output a motion detection signal indicating the presence of detected motion or may cause one or more actions in response to the detected motion. In other cases, the processor may require two or more sequential difference values (e.g., 2, 3, 4, 10, 20, etc.) to fall within the minimum and maximum threshold range before determining that the detected object is moving. In other cases, the processor may require a number of sequential difference values to fall between the minimum and maximum thresholds and to be different from each other within a predetermined fluctuation range before determining that the detected object is moving. For example, the predetermined fluctuation range may be a percentage, a real number, or determined by a formula, such as those described in step 606.

In some embodiments, the number of the sequential difference values required to infer the existence of actual motion may be determined using an empirical method, a statistical method, a machine learning method, or any other suitable method. For example, it may be determined through experiment that a single value falling between the minimum and maximum thresholds is highly likely to return an indication of actual motion, but may have only a 50% accuracy, as about half of the instances in which motion was inferred, no motion was present. In other tests, it may be determined that requiring a higher number of sequential difference values (e.g., 2, 3, 5, etc.) to fall within the minimum and maximum difference thresholds may result in fewer determinations of actual motion, but where motion is inferred, the accuracy may be higher. Thus, a confidence in output motion signals may be higher, in some cases, where two or more sequential differences values falling within the min and max thresholds is required to output a motion signal.

In some embodiments, the processor may analyze collected distance values and/or determined difference values to identify not just the actual motion of a detected object, but also motion events. For example, the processor may determine a time at which a detected object begins moving (e.g., when a difference value between two acquired distance values associated with the object falls between the minimum and maximum thresholds). The processor may determine how long the object continues to move (e.g., a period of time when a sequence of difference values all fall between the minimum and maximum thresholds, or when a predetermined percentage of difference values (e.g., 50%, 75%, 90%, etc.) within a sequence falls between the minimum and maximum thresholds). In this way, and by monitoring distance and difference values over time, the processor may determine when an object begins to move, when the object ceases to move, and how the object moves during the period of detected motion.

In some embodiments, when the processor outputs the motion detection signal, the motion detection signal may be used to activate a component in a system. In some cases, the activated component may be coupled with the sound wave receiver. For example, the sound wave receiver may be integrated with a stereo system. When an actual motion is detected, the motion detection signal may cause the stereo system to balance the volume load, cancel microphone echoes, activate the stereo system, increase or decrease volume of the stereo system, illuminate one or more controls (e.g., a button, a touchscreen, an LED indicator, or the like), activate one or more onboard lights, illuminate a user interface panel, or the like. It should be noted that the application of the motion signal is not limited to the examples described herein.

In some embodiments, method 600 may be performed in an iterative manner to detect different motion events of one or more objects in the sensor environment. For example, the processor may determine that a first set of difference values consecutively determined to be within ($\Delta_{min}$, $\Delta_{max}$) represents a first motion. The processor may determine that the first motion ends when one or more new difference values fall outside ($\Delta_{min}$, $\Delta_{max}$). The processor may determine that a second set of difference values determined to be within ($\Delta_{min}$, $\Delta_{max}$) represents a second motion event. For example, as shown in FIG. 7, values 702-708 may represent a first motion event. Values 710-712 may represent non-motion (e.g., the object is still). Values 714-716 may represent a second motion event. Values 718-720 may represent non-motion (e.g., the object has a non-ideal shape or surface that rotates a bit). Values 722-734 may represent a third motion event. While FIG. 7 corresponds to the motion of a single detected object over time, it should be noted that the disclosed system may similarly monitor the motion of multiple objects in the sensor environment over time to determine which of those objects are associated with actual motion.

The distance values received from the sensor may be stored according to the requirements of a particular application. In some cases, only the most recent two distance values for a particular object are stored or maintained in order to evaluate whether the most recent change in distance falls within the minimum and maximum thresholds. In other cases, a series of distance values for a particular object over time may be maintained in memory. Maintaining multiple distance values may enable detection and/or characterization of motion events, as described above. In some cases, the received distance values may be maintained in a sliding window manner. In other words, once an array including a predetermined number of distance values, for example, has been acquired, newly received distance values may be introduced into the array according to a first-in-first-out (FIFO) protocol.

The embodiments herein may be implemented using software programming or software elements the disclosure may be implemented with any programming or scripting languages such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the disclosure could employ any number of conventional techniques for electronics configuration, signal processing, and/or control, data processing, and the like. The steps of all methods described herein may be performable in any suitable order unless otherwise indicated herein or otherwise clearly contradicted by context.

In this disclosure, the terms "signal," "data," and "information" are used interchangeably. The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The term "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion.

In addition, the articles "a" and "an" as used in this disclosure and the appended claims should generally be construed to mean "one or more" unless specified otherwise or clear from context to be directed to a singular form. Moreover, the use of the term "an aspect" or "one aspect" throughout is not intended to mean the same embodiment or aspect unless described as such. Furthermore, recitation of ranges of values herein are merely intended to serve as a shorthand method of referring individually to each separate value falling within the range, unless otherwise indicated herein, and each separate value is incorporated into the specification as if it were individually recited herein.

As used in this disclosure, the term "or" is intended to mean an inclusive "or" rather than an exclusive "or" for two or more elements it conjoins. Unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" used in this disclosure is intended to mean an "and" or an inclusive "or." That is, unless specified otherwise, or clear from context, "X includes A, B, and/or C" is intended to mean X may include any combinations of A, B, and C. In other words, if X includes A; X includes B; X includes C; X includes both A and B; X includes both B and C; X includes both A and C; or X includes all A, B, and C, then "X includes A, B, and/or C" is satisfied under any of the foregoing instances. Similarly, "X includes at least one of A, B, and C" is intended to be used as an equivalent of "X includes A, B, and/or C."

The aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines or connectors shown in the various figures presented are intended to represent example functional relationships and/or physical or logical couplings between the various elements. Many alternative or additional functional relationships, physical connections, or logical connections may be present in a practical device.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A computer-implemented method for detecting movement of an object, the method comprising:
   receiving a plurality of output signal values from a sound wave receiver, each of the plurality of output signal values being representative of a distance between the object and the sound wave receiver;
   determining, based on the received plurality of output signal values, a difference value representative of a difference between a first output signal value and a second output signal value among the plurality of output signal values;
   determining whether the difference value is representative of motion of the object or non-motion of the object based on whether or not the difference value has a magnitude greater than or equal to a predetermined minimum threshold and smaller than or equal to a predetermined maximum threshold; and
   outputting a motion detection signal if the difference value is determined to have a magnitude greater than or equal to the predetermined minimum threshold and smaller than or equal to the predetermined maximum threshold.

2. The computer-implemented method of claim 1, further comprising identifying a motion event associated with the object based on two or more consecutive difference values determined to have magnitudes greater than or equal to the predetermined minimum threshold and smaller than or equal to the predetermined maximum threshold.

3. The computer-implemented method of claim 2, further comprising identifying a motion event associated with the object based on at least a predetermined number of sequential difference values having magnitudes greater than or equal to the predetermined minimum threshold and less than or equal to the predetermined maximum threshold.

4. The computer-implemented method of claim 1, wherein the difference value is determined based on adjacent pairs of output signal values from among the plurality of output signal values from the sound wave receiver.

5. The computer-implemented method of claim 1, wherein the sound wave receiver comprises an ultrasonic sensor.

6. The computer-implemented method of claim 1, wherein the first output signal value is output by the sound wave receiver at a first timestamp, and the second output signal value is output by the sound wave receiver at a second timestamp, wherein the second timestamp is later than the first timestamp and wherein the sound wave receiver outputs no output signal value between the first and the second timestamps.

7. A device for detecting movement of an object, the device comprising:
   a sound wave receiver;
   a processor; and
   a memory coupled to the processor, the memory configured to store instructions which when executed by the processor become operational with the processor to:
      receive a plurality of output signal values from the sound wave receiver, each of the plurality of output signal values being representative of a distance between the object and the sound wave receiver;
      determine, based on the received plurality of output signal values, a difference value representative of a difference between a first output signal value and a second output signal value among the plurality of output signal values;
      determine whether the difference value is representative of motion of the object or non-motion of the object based on whether or not the difference value has a magnitude greater than or equal to a predetermined minimum threshold and smaller than or equal to a predetermined maximum threshold; and
      output a motion detection signal if the difference value is determined to have a magnitude greater than or equal to the predetermined minimum threshold and smaller than or equal to the predetermined maximum threshold.

8. The device of claim 7, wherein the memory further comprises instructions which when executed by the processor, become operational with the processor to:
   identify a motion event associated with the object based on two or more consecutive difference values determined to have magnitudes greater than or equal to the predetermined minimum threshold and smaller than or equal to the predetermined maximum threshold.

9. The device of claim 8, wherein the memory further comprises instructions which when executed by the processor, become operational with the processor to:
   identify a motion event associated with the object based on at least a predetermined number of sequential difference values having magnitudes greater than or equal to the predetermined minimum threshold and less than or equal to the predetermined maximum threshold.

10. The device of claim 7, wherein the difference value is determined based on adjacent pairs of output signal values from among the plurality of output signal values from the sound wave receiver.

11. The device of claim 7, wherein the sound wave receiver comprises an ultrasonic sensor.

12. The device of claim 7, wherein the sound wave receiver comprises an ultrasonic transducer.

13. The device of claim 7, wherein the first output signal value is output by the sound wave receiver at a first timestamp, and the second output signal value is output by the sound wave receiver at a second timestamp, wherein the second timestamp is later than the first timestamp and wherein the sound wave receiver outputs no output signal value between the first and the second timestamps.

14. A non-transitory computer-readable storage medium, comprising instructions for detecting movement of an object, which instructions, when executed by a processor, become operational with the processor to:
   receive a plurality of output signal values from the sound wave receiver, each of the plurality of output signal values being representative of a distance between the object and the sound wave receiver;
   determine, based on the received plurality of output signal values, a difference value representative of a difference between a first output signal value and a second output signal value among the plurality of output signal values;
   determine whether the difference value is representative of motion of the object or non-motion of the object based on whether or not the difference value has a magnitude greater than or equal to a predetermined minimum threshold and smaller than or equal to a predetermined maximum threshold; and output a motion detection signal if the difference value is determined to have a magnitude greater than or equal to the predetermined minimum threshold and smaller than or equal to the predetermined maximum threshold.

15. The non-transitory computer-readable storage medium of claim 14, further comprising instructions that when executed by a processor, become operational with the processor to:

identify a motion event associated with the object based on two or more consecutive difference values determined to have magnitudes greater than or equal to the predetermined minimum threshold and smaller than or equal to the predetermined maximum threshold.

16. The non-transitory computer-readable storage medium of claim 15, further comprising instructions that when executed by a processor, become operational with the processor to:

identify a motion event associated with the object based on at least a predetermined number of sequential difference values having magnitudes greater than or equal to the predetermined minimum threshold and less than or equal to the predetermined maximum threshold.

17. The non-transitory computer-readable storage medium of claim 14, wherein the difference value is determined based on adjacent pairs of output signal values from among the plurality of output signal values from the sound wave receiver.

18. The non-transitory computer-readable storage medium of claim 14, wherein the sound wave receiver comprises an ultrasonic sensor.

19. The non-transitory computer-readable storage medium of claim 14, wherein the sound wave receiver comprises an ultrasonic transducer.

20. The non-transitory computer-readable storage medium of claim 14, wherein the first output signal value is output by the sound wave receiver at a first timestamp, and the second output signal value is output by the sound wave receiver at a second timestamp, wherein the second timestamp is later than the first timestamp and wherein the sound wave receiver outputs no output signal value between the first and the second timestamps.

* * * * *